Patented Feb. 16, 1954

2,669,282

UNITED STATES PATENT OFFICE 2,669,282

LAMINATING ADHESIVE AND MANUFACTURE OF COMBINED FIBERBOARD THEREWITH

Robert L. Kreyling, Wynnewood, Pa., assignor to Philadelphia Quartz Company, Philadelphia, Pa., a corporation of Pennsylvania No Drawing. Application June 21, 1950, Serial No. 169,537

19 Claims. (Cl. 154—33.05)

This invention relates to laminating adhesive and manufacture of combined fiber board therewith; and it comprises a novel starch-clay-silicate adhesive, particularly adapted to the manufacture of combined fiber board, containing from about 3 to 30 per cent of a raw unswollen starch-like material, having the property of swelling by hydration before going into solution when heated in water to temperatures within the range of about 55° to 80° C., and from about 30 to 4 per cent of a finely-divided raw inert siliceous material, such as kaolinitic clay or diatomaceous earth having an average particle size not substantially exceeding about 2 microns, said starch and siliceous materials being dispersed in an aqueous solution of sodium silicate constituting at least about 65 per cent by weight of the adhesive as a whole; the viscosity of said silicate solution being within the range of from about 0.25 to 15 poises at 20° C. and its gravity being within the range of from about 30 to 50 degrees Baumé at 20° C., said silicate having a per cent ratio of $Na_2O$ to $SiO_2$ within the range of from about 1:2 to 1:4.2; said adhesive having at operating temperatures an over-all viscosity of from about 0.5 to 15 poises, a filter test at operating temperatures of from about 2 cc. to 15 cc. and having the characteristic property of increasing substantially in viscosity when heated to temperatures within the range of from about 55° to 90° C. My invention also includes a process of using the described adhesive in the making of combined fiber board on one of the conventional high-speed laminating machines wherein the adhesive is applied to the face of one ply and at least one additional ply is combined therewith, the adhesive being heated substantially immediately upon application to the plies to temperatures causing swelling of its starch-like material whereby a flash bond is produced; all as more fully hereinafter set forth and as claimed.

During the past several years an important demand has arisen from the manufacturers of combined paper board for quick-setting adhesives to be used on their high-speed laminating machines. These machines have been developed mechanically to the point at which practically the sole limit upon the linear speed employed is the time of setting of the adhesives, used to adhere the plies. Silicate adhesives, the setting of which depends primarily upon loss of moisture have been used extensively with laminating machines operated at speeds not exceeding about 250 to 300 linear feet per minute which is close to the upper limit of speeds obtainable with straight silicate adhesives. These speeds are now coming to be considered too slow for commercial practice; hence many attempts have been made to increase the speed of set of silicate adhesives by modifying them in various ways.

One of the most successful of these attempts is described in my copending application, Serial No. 694,533, filed September 3, 1946, now Patent No. 2,554,035, in which a silicate adhesive is described which is modified by the addition of clay and which is heated before being applied to the plies to be united. This clay-silicate adhesive has an over-all viscosity which passes through a minimum at temperatures within the range of from about 50 to 85° C. and consequently, when this adhesive is applied hot to a ply which has been preheated to temperatures somewhat above this range the viscosity increases due to the heating effect per se as well as to loss of moisture. The setting time of this adhesive ranges from about 15 to 30 seconds and its use enables corrugating machines to be operated at speeds of up to about 400 to 500 feet per minute.

Another silicate-containing adhesive is described in the U. S. Patent No. 2,457,108, in which what is essentially a vegetable protein adhesive is modified by the addition of sodium silicate to produce a water resistant bond. When this adhesive is heated during the laminating procedure the protein glutinizes whereby the viscosity rapidly increases resulting in what is called the "grab" required of laminating adhesives. The primary disadvantages of this adhesive are its lack of initial tack and its short operating life which usually requires that the adhesive be prepared on the job and in small batches. The protein gradually becomes glutinized even at ordinary temperatures.

It has also been proposed to modify silicate adhesives by the addition of starch and various advantages are alleged to result from this addition, including a reduced time of set. To my knowledge, however, this modification has not come into commercial use and my tests indicate that starch-silicate adhesives do not set as rapidly as the clay-silicate adhesives of my acknowledged copending application, do not have the thixotropic properties required of high-speed laminating adhesives and they penetrate the plies unduly. The mere addition of starch to silicate solutions cannot result in the desired reduction of staining and it reduces the strength and caliper of the laminated product.

I have discovered a new adhesive which has none of the outstanding faults of the adhesives mentioned above. Surprisingly I have found that the inclusion of from about 3 to 30 per cent of a raw or unswollen starch-like material in certain clay-silicate adhesives produces a greatly increased speed of set which is actually so short that it cannot be measured by ordinary methods. When this adhesive is applied and pressed between two plies to be united and substantially simultaneously heated to hydrating temperatures, the flash bond immediately produced is sufficiently strong to permit bending, scoring, printing and cutting operations to be performed at once without damaging the bond. This appears to be a new result in the art and practical runs show that at last, an adhesive has been discovered which substantially eliminates the restrictions placed by the adhesive upon the future speeds of laminating machines.

A surprising effect is obtained in my new adhesive in that the hydrating temperature of the starch material therein is raised at least about 10° C. by the presence of the clay and silicate. While starch and water mixtures show a rapid increase in viscosity at temperatures of from about 68° to 70° my adhesives pass through a minimum of viscosity at about 70° to 75° C. and must be heated to temperature of about 75° to 80° before a rapid increase of viscosity is obtained. While the cause for this is not known it is advantageous in that it enables my adhesives to be heated prior to application to temperatures within the range of from about 55° to 75° C. This preheating increases the machine speeds of which the adhesive is capable. The optimum temperature of application depends upon the machine speed desired and to some extent upon the composition of the adhesive. But speeds higher than those obtainable with other adhesives can be attained without preheating the new adhesive.

In addition to producing a faster set my new adhesive possesses other scarcely less important advantages as compared with prior adhesives. One important property possessed by my adhesive is that when applied and heated it swells or increases in volume due to swelling upon hydration of the starch-like material and in spite of loss of water. I believe that this accounts for the fact that in the production of corrugated papers the use of the new adhesive substantially eliminates the occurrence of areas wherein the adhesive has failed to bond due to lack of contact between the plies. My new adhesive, owing to its swelling properties, tends to bridge over any gaps between the plies which may be caused by irregularities in thickness of the plies, variations in caliper of the corrugations, variations in pressure between the rolls etc.

I have also found that the new adhesive practically eliminates dusting or crumbling. Practically all silicate adhesives when thoroughly dry tend to crumble and to form dust when subjected to mechanical handling, such as in the printing operation. For example, it is rather common to see layers of dust from 1/8" to 3/8" thick around a printer's table when straight silicate adhesives have been employed in combining the board which is being printed. This dust is a hazard to the eyes of the workmen as well as being unsightly. This dusting is substantially eliminated by the use of my new adhesive which I attribute to the fact that the starch material present tends to stabilize the moisture content.

A number of other advantages are gained by the use of the new adhesive, such as reduced staining caused by migration of the alkali in the adhesive through the plies under humid conditions, increased flexibility of the board and easier cleaning of excess adhesive from the adhesive rolls and from the "fingers" which are used to guide the paper stock and to clean the rings indented in the glue rolls of laminating machines. I have found that deposits of the new adhesive on corrugating rolls tend to curl at their edges when dry and these deposits are then readily removed with a scraper or even by the action of the paper board rubbing against them during normal operations of the machine. In one operation, for example, it was found possible to clean the "fingers" of the machine only about once in four weeks, as compared to several times a day with the adhesive used previously.

When diatomaceous earth is used as the inert siliceous component of my new adhesive removal of adhesive deposits becomes even easier. Deposits of adhesive containing diatomaceous earth on heated plates tend to swell up and to "pop off" with almost explosive violence, somewhat like the popping of corn.

A more important advantage gained by use of the new adhesive is that the caliper of the combined board is slightly greater than that obtained with other adhesives. This frequently amounts to 0.004 inch with some types of stock. This effect I believe to be due to the fact that the new adhesive penetrates the plies with a smaller amount causing less softening of the plies and less crushing in passage through the corrugator, take-off and finishing equipment. An equally important advantage is that the finished combined board produced with my adhesive has better over-all bond strength. And its crushing strength is higher as indicated by flat crush and compression tests.

A further advantage of my new adhesive is that its viscosity at operating temperatures is not as critical as in prior adhesives. I attribute this to the fact that the starch-like material swells in hydrating to fill any voids and also that the required "grab" or viscosity increase is produced over a relatively wide range of composition. With a combination of the tacky silicate and the increase in volume less accuracy of control and less skill on the part of the operator is required to use as well as to make up the new adhesive. The clay-silicate adhesive described in my acknowledged copending application in some cases could only be used on the so-called double-facer of a corrugating machine whereas my new adhesive can be varied in viscosity to suit the conditions encountered and the same adhesive can then be used on the single facer as well as the double facer. A very practical advantage of my new adhesive is that it is possible to economize in the quantity or volume of adhesive used, which I attribute to the swelling of the adhesive when applied.

The life of my new adhesives at ordinary room temperatures is indefinite and comparable to that of silicate and silicate-clay adhesives. Owing to this long life and the fact that their operating viscosity is less critical it is feasible for these adhesives to be produced by the adhesive manufacturer and transported to the box manufacturer just as with silicate and silicate-clay adhesives. This long life is, of course, an important feature and is obtained only with adhesives which contain no more than about 2 per cent protein or less than 0.5 per cent of nitrogen. The starch-like component of the adhesive should contain no more than about 5 to 7 per cent of protein.

The starch material present in my new adhesives increases the consistency and thus to some extent performs the function of the clay in clay-silicate adhesives. But strangely the starch material does not render the adhesives thixotropic and when used alone it fails to prevent undue penetration. When used on some paper stocks starch-silicate adhesives penetrate to such an extent that an insufficient residue of adhesive is left on the surface to produce a satisfactory bond. Penetration of an adhesive can be measured at least roughly by the so-called filter test, described in the U. S. Patent No. 2,239,358. For my high-speed laminating adhesive the filter test should be between about 3 cc. and 15 cc. at the temperature of application. When used in the making of solid fiber board the best range is from about 1 to 10 cc. while for corrugated board best results are obtained when the filter test is from 4 to 15 cc.

Thixotropy is as important as lack of penetration in high-speed laminating adhesives in order that the adhesive when applied shall stay where placed and not spread and flatten out. I have found that, in order to obtain this effect even with adhesives containing a maximum content of starch, the presence of at least from about 4 to 20 per cent of a fine inert siliceous material is usually required in the adhesive, the amount depending upon the type of siliceous material used.

In the case of Wyoming bentonite it is possible to obtain the required thixotropic properties with the use of down to about 1.5 per cent by weight. But in the case of a china or ball clay a minimum quantity of about 12 per cent is required, while for a South Carolina kaolin the minimum requirement is about 6 per cent. In the case of diatomaceous earth the minimum quantity required to produce thixotropy is about 5 per cent. The optimum quantity of this component to be used is usually a few per cent above these minima while the maximum quantity permissible is determined by the viscosity requirements of the adhesive. No more should be used than is required to produce a viscosity of from about 0.5 to 5 poises at operating temperatures for the manufacture of corrugated paper board or from about 5 to 15 poises at operating temperatures for the manufacture of solid fiber board. In the case of some clays the clay content may reach to from 25 to 30 per cent by weight before a viscosity of 15 poises is exceeded. Adhesives which are to be heated before use advantageously contain more clay, the best range being from about 10 to 30 per cent by weight, while adhesives which are to be applied at room temperatures advantageously contain a clay content falling within the range of from about 4 to 25 per cent by weight, the optimum quantity depending upon the type of clay used.

Any finely-divided inert siliceous material can be used in my adhesives provided that the particle size is such that the material has colloidal properties when mixed with water. This means that about 92 to 99 per cent or more of the material must pass a 325 mesh screen. At least about 50 per cent of the siliceous material should have a particle size not substantially exceeding about 2 microns. Among the most advantageous materials which I have used there may be mentioned diatomaceous earth, fuller's earth principally a magnesium montmorillonite, bentonite, talc, china clay and the treated kaolinites such as those calcined at 750° C., thus making the $Al_2O_3$ content more reactive or those calcined to 1050° C. which reduces the activity of the $Al_2O_3$ content but increases the activity of the $SiO_2$ present.

The proper starch-like material content of my adhesives is determined by the production of the flash set or quick "grab" required at high speeds. My tests indicate that when this content is reduced to about 5 per cent by weight a measurable time to set is produced whereas with a somewhat greater content the setting time is so short that it cannot be measured by ordinary methods. If maximum operating speeds are not required it is possible, of course, to reduce the content still further and I have found that contents as low as about 3 per cent appreciably increase the setting rates of clay-silicate adhesives. Since the starch-like material is the most costly component of my adhesives it is advisable to employ no more than is required to produce the desired flash set. While it is possible to employ up to about 30 per cent by weight without detrimentally affecting the properties of the adhesive a more practical upper limit is about 10 per cent. The starch-like material content affects the consistency of the adhesive although not to quite the same extent as the more colloidal clays.

The starch-like material should, of course, be ground very fine. It is best to employ a material having a particle size such that at least about 25 to 50 per cent passes a 250 mesh screen. All types of commercial raw starches can be used provided that they contain no more than about 5 to 7 per cent of protein. Thus corn starch, rice starch, potato starch, sago, tapioca and cassava starches, arrowroot, arum, the so-called moss starch, inulin and glycogen can all be used. All other starch-like materials, having the property of swelling by hydration before going into solution when heated with water to temperatures within the range of from about 55° to 80° C. are useful in my adhesives. These include starch derivatives, such as methylcellulose, starch esters, sodium palconate, the sodium salt of palconic acid, an alkali-soluble material extracted from redwood bark with sodium hydroxide which has been shown to consist mainly of a partially methylated phenolic acid, containing aliphatic hydroxyls, phenolic hydroxyls, and carboxyl groups in the ratio of 2:4:3; see an article by Frank A. Kottwitz and L. D. Forman in Ind. Eng. Chem., 40, 243 (1948); supplied by The Pacific Lumber Company and described in their Technical Bulletin No. T-4 (1950); "Silvacon," a complex mixture of the salts of lignin and tannic acids derived from spruce wood, supplied by Weyerhaeuser Timber Company, more fully described in Western Pulp and Paper, vol 1, #4, pages 12–14 (1948); "Solkafil," a cellulose pulp preparation made from wood fibers, described in "The Handbook of Material Trade Names," Zimmerman and Lavine, 1946, published by Industrial Research Service, Dover, N. H., supplied by the Brown Company, and "Solkafloc" which is fully described on pages 131 and 132 of the Chemical Materials Catalog" (1949–1950), supplied by the Brown Company. The term "starch-like material" as used in the following claims is intended to include these starch-like materials.

The silicate solution used as the liquid or aqueous phase of my adhesive may, as indicated previously, have a per cent ratio of $Na_2O$ to $SiO_2$ within the range of from about 1 to 2 to 1 to 4.2 and a viscosity of from about 0.25 to 15 poises at 20° C. The permissible range of gravities of the silicate solution ranges from about 30° to 50° Bé.

at 20° C., the higher gravities being employed with the more alkaline silicates. For adhesives which are to be applied hot, i. e. which are heated before application, the liquid phase gravity should lie between about 32 and 50° Bé., while for adhesives which are to be applied at room temperatures the range is from about 30 to 48° Bé. Commercial silicate solutions can be employed, usually with the addition of small amounts of water, or solid silicates can be dissolved in the proper quantities of water required to produce the required gravities. Owing to the fact that the more alkaline silicates of a given concentration have the lower viscosities it is possible to employ more clay and/or more starch with the former.

My invention can be explained in greater detail by reference to the following specific examples which represent practical operating embodiments thereof.

EXAMPLE 1

A series of adhesives was prepared containing various proportions of a kaolin clay, Barden clay, obtained from J. N. Huber Co., of New York city, corn starch i. e. pearl starch, water and sodium silicate. The silicate had a composition of 8.3% $Na_2O$ and 28.2% $SiO_2$, the remainder being substantially water. The kaolin clay used had a particle size such that 80–85% of the particles were less than 2 microns in size and 99.6% passed a 325 mesh screen. Moisture content was less than 1%, its bulk density 30 lbs./cu. ft., and pH 3.5–5.0. The starch used was a raw or unswollen ground corn starch. The adhesives were prepared by mixing the clay into the silicate with vigorous agitation. Starch was then added with further agitation. A maleic ester of rosin was used in some of these compositions and this was added to the clay-silicate mixture.

The liner materials used were a B flute kraft paper board and the adhesive was applied at the speeds indicated to both the single-face and double-face bonds using a 90° wrap on a 36" preheater for the double-face liner. The following tables are self-explanatory in showing the advantages of my new sodium silicate adhesive mixtures containing both a siliceous inert material and a raw starch:

Mixes 1 to 3 inclusive contained a small amount—from 0.3 to 0.5%—of the maleic ester of rosin, sodium silicate making up the balance of the compositions.

It will be noted from the above table that the setting time was reduced from 30 seconds, obtained with the clay-silicate adhesives of mixes 1 and 1a, to substantially zero for adhesives containing an adequate amount of both clay and starch; mixes 2 to 6. The staining time was simultaneously increased from 3–5 minutes to values above 30 minutes. The caliper of 0.112, obtained with mix 1a and a 33# liner, was increased to 0.116 by incorporating starch, as in mix 2a. When both the clay and the starch were reduced, as in mix 5, the setting time showed a tendency to rise although still far below that obtained with the clay-silicate mix. This mix also penetrated the board unduly. Mix 6 gave the best compression strength and an excellent bond. The speeds employed were not the maximum of which the adhesives were capable. Dusting of the cured board was practically eliminated throughout the finishing department in the case of the starch-clay-silicate adhesives and it was found that heavy deposits of these adhesives on the hot metal surfaces expanded to a very porous structure adhering at irregular spots which permitted easy removal with a scraper while thin smears curled at the edges and were flaked off voluntarily by the passing board. This series of tests gives definite indication that clay is required to control placement until the initial bond is formed, to show greatly increased resistance to alkali migration in a steam atmosphere but that a moderate amount of starch was adequate to give the fast initial bond to permit high-speeds and to eliminate warp.

EXAMPLE 2

An adhesive was prepared using the same silicate as in the previous example but the siliceous material used was a diatomaceous earth shipped from Fernley, Nevada, having a density of 19 lbs./cu. ft., a water content of less than 5% and 91% of the material passed through a 325 mesh screen. This siliceous inert was mixed with the

*Table I.—Operating conditions*

| Mix | Starch | Clay | Commercial Silicate | Water | Viscosity, secs. (Marsh) | Liner, lb./M. | Speed, F. P. M. |
|---|---|---|---|---|---|---|---|
| 1 | | 13.1 | 84.9 | 1.6 | 30 | 47 | 210 |
| 1a | | 13.1 | 84.9 | 1.6 | 30 | 33 | 215 |
| 2 | 11.5 | 11.5 | 74.3 | 2.7 | 39 | 45 | 320 |
| 2a | 11.5 | 11.5 | 74.3 | 2.7 | 39 | 33 | 290 |
| 2b | 11.5 | 11.5 | 74.3 | 2.7 | 39 | 47 | 290 |
| 3 | 20.3 | 10.2 | 65.9 | 3.7 | 100 | 45 | 345 |
| 4 | 12.2 | 6.1 | 79.0 | 2.9 | 87 | 45 | 340 |
| 5 | 7.4 | 3.7 | 84.0 | 4.9 | 74 | 47 | 260 |
| 6 | 8.0 | 10.0 | 78.8 | 3.4 | 63 | 47 | 260 |

*Table II.—Board properties*

| Mix | Secs. set | Warp | Board Caliper | Theoretical loss | Min. Stain | Flat Crush | Pop Test |
|---|---|---|---|---|---|---|---|
| 1 | 30 | 1/8 | .117 | .006 | 5 | | |
| 1a | 30 | 1/8 | .112 | .006 | 3 | | |
| 2 | 0 | 0 | .118 | .008 | 30+ | 450 | 235 |
| 2a | 0 | 0 | .116 | .002 | 30+ | 467 | 107 |
| 2b | 0 | 0 | .117 | .006 | 30+ | 425 | 250 |
| 3 | 0 | 0 | .113 | .008 | 30+ | 479 | 230 |
| 4 | 0 | 0 | .116 | .005 | 30+ | 459 | 245 |
| 5 | 5 | 1/8 | .117 | .006 | 30+ | 405 | 223 |
| 6 | 0 | 0 | .117 | .006 | 30+ | 472 | 223 | silicate in the same manner and starch added as before giving the composition:

|  | Per cent |
|---|---|
| Silicate solution | 78.9 |
| Water | 8.8 |
| Diatomaceous earth | 7.0 |
| Starch | 5.3 |

This run showed that the adhesive provided excellent restriction of penetration, placement control, fast preliminary set, reduction of dusting and alkali migration and gave substantially less build up on the hot metal surface. It provided better resistance to fiber tear than the best run of Example #1, allowed slightly more dusting and gave substantially easier removal of build up on the hot metal plates. This seemed to be due to the fact that the porous diatomaceous structure favored bubble formation within the deposited silicate film and on heating eventuated in an explosive removal similar to the reaction of pop corn.

EXAMPLE 3

In this example the same sodium silicate was used to make the following composition:

76 parts sodium silicate
6.5 parts water
9.7 parts clay
7.8 parts raw corn starch In this case the clay was a hard air-floated South Carolina kaolin having a specific gravity of 2.6, screen residue on 375 mesh of 0.17, a moisture content of about 1% and 80-85% of the particles less than 2 microns in size with only 4-8% greater than 5 microns. The analysis of this clay is approximately 37.9% $Al_2O_3$
34.9% $SiO_2$
1.7% $Fe_2O_3$
0.9% $TiO_2$
0.4% $CaO$
0.3% $MgO$
14.14% Water Using a silicate-clay adhesive without the starch the plant had been combining double wall board with the adhesive heated to 150° F. at a maximum of 240 F. P. M. With the new adhesive mixture operating at 92° F. they were able to attain a speed of 355 F. P. M. One of the liners applied was preheated to a temperature of about 180° to 220° F. before being applied. The board remained flat, edge adhesion was improved and B flute caliper increased from .116 to .121. In a further example a liner with an asphalt admix was used and speeds of operation were increased from 175 up to 290 F. P. M. with no evidence of warpage. On the same machine using 23 point kraft liners which showed delamination at the edges when run with silicate-clay at 160 F. P. M. with the improved mixture they were able to run at 240 F. P. M.

EXAMPLE 4

300 parts of a powdered hydrous silicate of soda containing approximately 19.4% $Na_2O$, 62.5% $SiO_2$ and 18% of water were mixed with 40 parts of finely ground California bentonite. This mixture was then stirred into 450 parts of water and allowed to stand while the silicate dissolved. To the mixture was then added 24 parts of water and 80 parts of unhydrated potato starch. The resulting adhesive was found suitable for use as an adhesive in making up corrugated or solid paper box board.

EXAMPLE 5

5,770 pounds of water and 250 pounds of a concentrated sodium silicate solution were fed to a mixer. The silicate solution had a gravity of 41° Bé. and a ratio of per cent $SiO_2$ to per cent $Na_2O$ of 3.22 to 1. 800 pounds of a South Carolina china clay were then thoroughly mixed in. When this mixture had become homogeneous it was run into a rotary atmospheric silicate dissolver, containing in excess of 3,160 pounds of silicate of soda glass having a ratio of per cent $SiO_2$ to per cent $Na_2O$ of 3.22 to 1. The resulting mixture was heated and agitated until a sample of the liquid tested about 39.5° Bé. while hot. The adhesive was then drawn off from the remaining silicate glass and after cooling was mixed with an additional 3% of water and 8% corn starch.

A similar adhesive was prepared in which a rotary pressure dissolver was used to dissolve an anhydrous sodium silicate glass in a slurry of clay and water. The temperature was maintained at about 150° C. at a pressure of 56 lbs. gauge for over an hour. After cooling, the starch was added. Both of these adhesives were found to be satisfactory laminating adhesives.

EXAMPLE 6

A clay slip was made up by dissolving 0.42 part by weight of trisodium phosphate and 0.39 part of tetra-sodium pyrophosphate in 112.5 parts of water to which was added 225 parts of a china clay. The mixture was agitated until the clay was thoroughly dispersed and the slip was then mixed without flocculation in 1162.5 parts by weight of a sodium silicate solution containing 9.2% $Na_2O$ and 29.4% $SiO_2$ and having a ratio of per cent $SiO_2$ to per cent $Na_2O$ of 1 to 3.20 with vigorous agitation. To this adhesive composition was added 5% potato starch moistened with 2% of additional water. Bonds made with this adhesive showed additional resistance to staining and to loosening by high humidities.

EXAMPLE 7

An adhesive was prepared by mixing 14 parts of green stripe clay, N. Clark & Sons Inc., with 86 parts of a sodium silicate solution containing 8.2% $Na_2O$ having a ratio of per cent $SiO_2$ to per cent $Na_2O$ of 1 to 3.4. To this mixture was added a further 2% of water and 10% of raw corn starch. This adhesive was passed through a heat exchanger so that its temperature was raised to approximately 65° C. before the adhesive was applied to the flute tips of the corrugated board. Machine speed was immediately increased without resulting in warped or split board.

EXAMPLE 8

Other cellulose derivatives such as the esters and ethers of starch have similar highly bunched chain structures which in the process of hydration increase viscosity very rapidly within a definite temperature interval. One such, a starch ester acetylated according to Treadway was used in the following proportions. 10 parts of South Carolina kaolin; 79 parts of commercial sodium silicate containing 8.3% $Na_2O$ and 28.2% $SiO_2$; 3.4 parts water and 8 parts of the acetylated starch. The resulting adhesive set rapidly after the manner of the raw starch previously used. It has the advantage that during the hydration some hydrolysis of the acetate occurs thus raising the ratio of the sodium silicate and increasing the rate of set above that of ordinary starch mixtures.

EXAMPLE 9

In another case 10 parts of sodium palconate, the sodium salt of palconic acid, were mixed with 10 parts of Barden clay and 77 parts of the commercial silicate used in the example above and with 3 parts of water. The mixture set rapidly in the temperature range of 50-80° C.

While I have described what I consider to be the more advantageous embodiments of this invention it is evident, of course, that various modifications can be made in the various compositions and specific procedures which have been described without departing from the purview of this invention. While I have described my adhesive as enabling laminating machines to be operated within a new range of speeds when the adhesives are heated to temperatures causing swelling of the starch-like material content immediately they are applied, it is possible to apply my adhesives at the temperatures conventionally used in laminating machines, that is, at or slightly above room temperatures, with the production of results which are substantially superior to those obtained with either clay-silicate or starch-silicate adhesives at these temperatures. This was quite surprising since one would naturally expect that, in order to obtain the advantages of the starch-like content of the adhesives, this content would have to be hydrated immediately upon application and before any substantial drying had taken place. But I have found that a conventional laminating machine can be speeded up substantially i. e. to the extent of 10 to 20%, by the use of my new adhesive when the adhesive itself has a temperature ranging from about 15 to 30° C. when applied and even without special preheating of the plies. The rolls of the conventional laminating machines are, of course, heated; hence some preheating of the plies takes place inherently in the use of such a machine and the following hot plates, which are conventionally heated to temperatures of from about 165° to 180° C., cause further heating. It is impossible to determine at just what point the adhesive in such a machine reaches hydrating temperatures but at speeds of upward of 300 feet per minute the combined board reaches the end of the hot plate section within about 15 seconds after application of the adhesive and it is evident from the results obtained that within this time period the starch-like material in the new adhesive must have hydrated to produce the improvement mentioned. The adhesive may thus be said to be heated to hydration temperatures substantially immediately upon application or at least before the end of the hot plate section is reached, when the adhesive temperature at the moment of application is from about 15 to 30° C. The laminating machines can be increased in speed at least an additional 10–20% by the use of plies which are specially preheated to temperatures of from about 80 to 105° C. and/or by heating the adhesive immediately before application to temperatures of from about 40 to 80° C. If the adhesive is preheated in this manner it is advantageous to provide an enclosure about the transfer roll and the adhesive bath to prevent evaporation of moisture, introducing steam into the enclosure if necessary.

It is possible within the scope of my invention to include dispersing and/or wetting agents into my adhesive. These are particularly useful in making up the adhesive to produce quick wetting of the starch and siliceous inert. This is exemplified in Example 6 by the use of phosphates as dispersing agents. It is also possible, of course, to employ two or more starch-like materials in admixture in my adhesives. Further modifications of my invention which fall within the scope of the following claims will be immediately evident to those skilled in this art.

What I claim is:

1. A stable laminating adhesive particularly adapted to the production of combined paper board on high-speed laminating machines, which comprises a solution of sodium silicate constituting at least about 65 per cent by weight of the adhesive and having uniformly dispersed therein from about 3 to 30 per cent by weight of finely-divided raw, unswollen starch-like material, containing no more than from about 5 to 7 per cent of protein and having the property of swelling by hydration before going into solution when heated with water to temperatures of from about 55° to 80° C., and from about 30 to 4 per cent by weight of an inert finely-divided siliceous material having an average particle size not substantially exceeding about 2 microns, said silicate solution having a viscosity within the range of from about 0.25 to 15 poises and a gravity of from about 30 to 50° Bé at 20° C. with a per cent ratio of $Na_2O$ to $SiO_2$ within the range of from about 1:2 to 1:4.2; said adhesive having an overall viscosity at operating temperatures of from about 0.5 to 15 poises, a filter test at operating temperatures of from about 3 to 15 cc., having the characteristic property of increasing substantially in viscosity when heated to temperatures within the range of from about 55 to 90° C. and being substantially free from protein.

2. The adhesive of claim 1 wherein said siliceous material is a kaolinitic clay.

3. The adhesive of claim 1 wherein said siliceous material is a diatomaceous earth.

4. The adhesive of claim 1 wherein the starch-like material is raw starch and is present in proportions ranging from about 5 to 10 per cent by weight.

5. The adhesive of claim 1 wherein the sodium silicate solution has a viscosity of from about 1 to 8 poises at 20° C. and a gravity of from about 32 to 50° Bé said adhesive being adapted to be used at operating temperatures within the range of from about 40 to 80° C.

6. The adhesive of claim 1 wherein the sodium silicate solution has a viscosity of from about 0.25 to 1.5 poises at 20° C. and a gravity within the range of from about 30 to 48° Bé, said adhesive being adapted to be used at approximately room temperatures.

7. The adhesive of claim 1 wherein the overall viscosity is within the range of from about 5 to 15 poises at operating temperatures and the adhesive is adapted to the making of solid fiber board.

8. The adhesive of claim 1 wherein the overall viscosity is within the range of from about 0.5 to 5 poises at operating temperatures and the adhesive is adapted to the making of corrugated paper board.

9. In the manufacture of laminated paper board on high-speed laminating machines wherein at least two plies are combined with an adhesive containing a sodium silicate solution as its aqueous phase having a viscosity within the range of from about 0.25 to 15 poises and a gravity of from about 30 to 50° Bé. at 20° C. with a per cent ratio of $Na_2O$ to $SiO_2$ within the range of from about 1:2 to 1:4.2, and containing substantially uniformly dispersed therein from about 3 to 30 per cent by weight of a finely-divided raw unswollen starch-like material, containing no more than from about 5 to 7 per cent of protein and having the property of swelling by hydration before going into solution when heated with water to temperatures of from about 55° to 80° C., and from about 4 to 30 per cent by weight of an inert finely-divided siliceous material having an average particle size not substantially exceeding about 2 microns; said adhesive having an over-all viscosity at operating temperatures of from about 0.5 to 15 poises, a filter test at operating temperatures of from about 3 to 15 cc. and having the characteristic property of increasing substantially in viscosity when heated to temperatures within the range of from about 55° to 90° C.; the process which comprises applying to the face of a ply to be laminated the adhesive defined above, immediately combining the adhesive-coated face with another ply under pressure and heating the adhesive substantially simultaneously with its application to temperatures within the range of from about 55 to 90° C., whereby a flash bond is produced capable of withstanding cutting, scoring and other mechanical operations.

10. The process of claim 9 wherein the adhesive used contains a kaolinitic clay as the siliceous material.

11. The process of claim 9 wherein the adhesive used contains diatomaceous earth as the siliceous material.

12. The process of claim 9 wherein the adhesive is heated just prior to application to temperatures within the range of from about 40 to 80° C.

13. The process of claim 9 wherein at least one of the plies to be combined is preheated to temperatures within the range of from about 80 to 105° C.

14. The process of claim 9 wherein the adhesive used is heated just prior to application to temperatures within the range of from about 40° to 80° C. and at least one of the plies to be combined is preheated to temperatures within the range of from about 80 to 105° C.

15. The process of claim 9 wherein the adhesive when applied is heated to temperatures within the range of from about 40° to 80° C. and the aqueous phase of said adhesive has a viscosity of from about 1 to 8 poises at 20° C. and a gravity of from about 32 to 50° Bé.

16. The process of claim 9 wherein the adhesive is applied at substantially room temperatures and the aqueous phase of said adhesive has a viscosity of from about 0.25 to 1.5 poises at 20° C. and a gravity within the range of from about 30 to 48° Bé.

17. The process of claim 9 wherein the laminated product produced is a solid fiber board and the over-all viscosity of the adhesive at operating temperatures is within the range of from about 5 to 15 poises.

18. The process of claim 9 wherein one of the plies combined is corrugated and the adhesive used has an over-all viscosity within the range of from about 0.5 to 5 poises at operating temperatures.

19. A stable laminating adhesive particularly adapted to the production of combined paper board on high-speed laminating machines, which comprises a solution of sodium silicate constituting at least about 65 per cent by weight of the adhesive and having uniformly dispersed therein from about 5 to 10 per cent by weight of raw starch, and from about 4 to 20 per cent by weight of an inert finely-divided siliceous material having an average particle size not substantially exceeding 2 microns, said silicate solution having a viscosity within the range of from about 0.25 to 15 poises and a gravity of from about 30 to 50° Bé. at 20° C. with a per cent ratio of $Na_2O$ to $SiO_2$ within the range of from about 1:2 to 1:4.2; said adhesive having an over-all viscosity at operating temperatures of from about 0.5 to 15 poises, a filter test at operating temperatures of from about 3 to 15 cc., having the characteristic property of increasing substantially in viscosity when heated to temperatures within the range of from about 55 to 90° C. and being substantially free from protein.

ROBERT L. KREYLING.

References Cited in the file of this patent

UNITED STATES PATENTS

| Number | Name | Date |
|---|---|---|
| 1,080,143 | Dunham | Dec. 2, 1913 |
| 1,147,996 | Wrede | July 27, 1915 |
| 1,498,270 | Harris | June 17, 1924 |
| 2,024,123 | Baker | Dec. 19, 1935 |
| 2,050,382 | Rowbotham et al. | Aug. 11, 1936 |
| 2,261,784 | Thompson | Nov. 4, 1941 |
| 2,301,695 | Gilliam | Nov. 10, 1942 |
| 2,487,647 | Goettsch | Nov. 8, 1949 |
| 2,554,035 | Kreyling | May 22, 1951 |